United States Patent
Hayden et al.

(10) Patent No.: US 8,764,401 B2
(45) Date of Patent: Jul. 1, 2014

(54) WIND TURBINE BLADE

(71) Applicant: Blade Dynamics, Ltd., Cowes (GB)

(72) Inventors: Paul Trevor Hayden, Cowes (GB); Harald Behmer, Newport (GB)

(73) Assignee: Blade Dynamics Ltd., Cowes, Isle of Wight (GB)

( * ) Notice: Subject to any disclaimer, the term of this patent is extended or adjusted under 35 U.S.C. 154(b) by 0 days.

(21) Appl. No.: 13/733,809

(22) Filed: Jan. 3, 2013

(65) Prior Publication Data
US 2013/0129518 A1    May 23, 2013

Related U.S. Application Data

(63) Continuation of application No. PCT/GB2011/001035, filed on Jul. 8, 2011.

(30) Foreign Application Priority Data

Jul. 8, 2010 (GB) .................................. 1011539.2

(51) Int. Cl.
*F03D 1/06* (2006.01)

(52) U.S. Cl.
CPC ............ *F03D 1/0633* (2013.01); *F03D 1/0675* (2013.01); *F05B 2240/302* (2013.01); *Y02E 10/721* (2013.01)
USPC .... 416/213 R; 416/224; 416/226; 416/229 R; 29/889.72

(58) Field of Classification Search
CPC ................. F03D 1/0633; F03D 1/0675; F05B 2240/302; Y02E 10/721
USPC .......... 416/2, 212 R, 213 R, 229 R, 238, 224; 29/889.7, 889.72; 403/270; 244/124
See application file for complete search history.

(56) References Cited

U.S. PATENT DOCUMENTS

| | | | | |
|---|---|---|---|---|
| 4,120,998 A | * | 10/1978 | Olez | .............................. 428/33 |
| 5,281,454 A | | 1/1994 | Hanson | |

(Continued)

FOREIGN PATENT DOCUMENTS

| | | |
|---|---|---|
| DE | 102 35 496 | 2/2004 |
| DE | 10 2008 055540 | 6/2009 |

(Continued)

OTHER PUBLICATIONS

International Search Report mailed on Mar. 9, 2012 in corresponding Application No. PCT/GB2011/001035.

(Continued)

*Primary Examiner* — Igor Kershteyn
(74) *Attorney, Agent, or Firm* — Knobbe, Martens, Olson & Bear, LLP

(57) ABSTRACT

A wind turbine blade comprising an aerodynamic fairing supported along at least a portion of its axial length by a spar (12). The spar comprises at least two spar segments (12) joined end-to-end at an interface (9), each spar segment comprising a shear web (3) with a spar cap (4) on each side. The outer face (6) of each spar cap tapers inwardly towards the interface such that its depth is reduced towards the interface creating a recess on each side of the interface formed by the tapered faces of adjacent spar caps. A respective connection piece (8) is sized to fit into each recess. Each connection piece (8) is sized to fit into each recess. Each connection piece (8) being fixed to the tapered faces of adjacent spar caps to form a double scarf joint.

15 Claims, 9 Drawing Sheets

(56) References Cited

U.S. PATENT DOCUMENTS

| | | | |
|---|---|---|---|
| 7,438,524 B2 * | 10/2008 | Lyders et al. | 415/200 |
| 2006/0083611 A1 * | 4/2006 | Wobben | 416/2 |
| 2006/0127222 A1 | 6/2006 | Arelt | |
| 2008/0069699 A1 | 3/2008 | Bech | |
| 2009/0162208 A1 | 6/2009 | Zirin et al. | |
| 2010/0116938 A1 | 5/2010 | Kline et al. | |
| 2010/0310379 A1 | 12/2010 | Livingston | |
| 2011/0036495 A1 | 2/2011 | Cinquin | |

FOREIGN PATENT DOCUMENTS

| | | |
|---|---|---|
| EP | 2 186 622 | 5/2010 |
| FR | 2710871 | 4/1995 |
| FR | 2919819 | 2/2009 |
| WO | WO 2006/002621 | 1/2006 |
| WO | WO 2009/034291 | 7/2008 |
| WO | WO 2009/077192 | 6/2009 |
| WO | WO 2012/004571 | 1/2012 |

OTHER PUBLICATIONS

Written Opinion of the International Searching Authority mailed in corresponding Application No. PCT/GB2011/001035.

Search report mailed on Nov. 4, 2010 in corresponding application GB1011539.2.

* cited by examiner

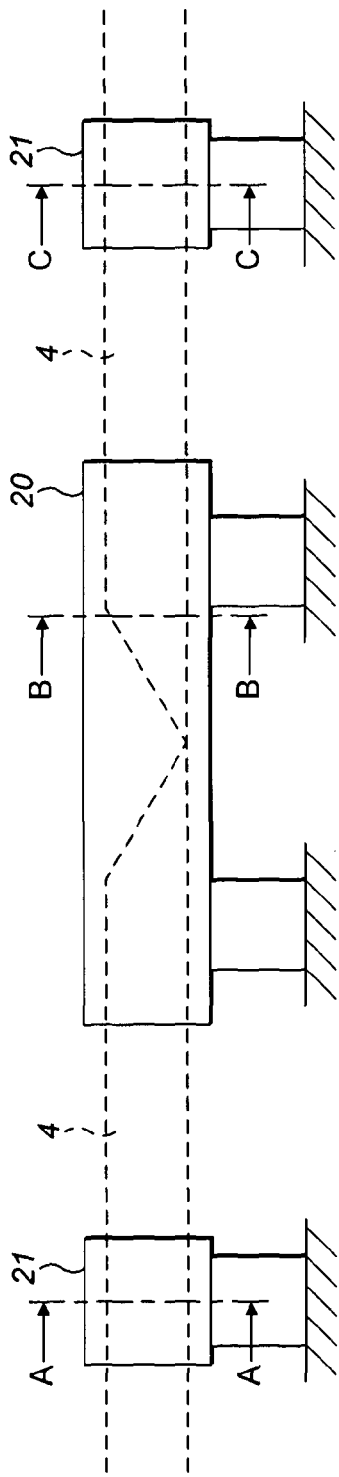
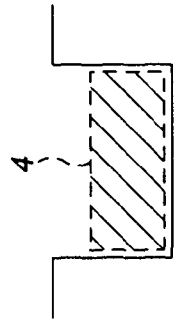
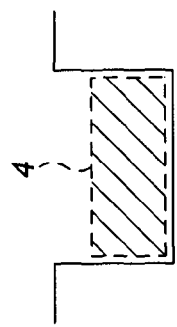
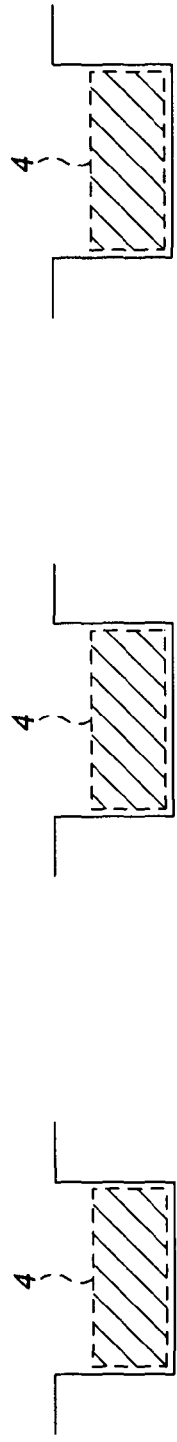
FIG. 9
FIG. 9A
FIG. 9B
FIG. 9C

WIND TURBINE BLADE

CROSS-REFERENCE TO RELATED APPLICATIONS

This application is a continuation of Patent Cooperation Treaty International Patent Application PCT/GB2011/001035, filed Jul. 8, 2011, and entitled "A WIND TURBINE BLADE," which is incorporated by reference herein in its entirety, and which claims priority to Great Britain Patent Application 1011539.2, filed on Jul. 8, 2010.

BACKGROUND OF THE INVENTION

1. Field of the Invention

The present invention relates to a wind turbine blade.

2. Description of the Related Art

There is an increasing trend for longer and longer wind turbine blades. This has led to a recent development whereby each blade is manufactured in a number of sections which are connected end-to-end in order to form the finished blade. The joint between these adjacent sections is critical to the operation of the blade.

Such wind turbine blades generally comprise an aerodynamic fairing supported by a longitudinally extending spar. In any blade consisting of a number of segments as referred to above, the joint between adjacent spar sections is critical as it is through this that the vast majority of the load is transmitted.

US 2008/0069699 discloses a wind turbine blade which is manufactured in two sections which are subsequently joined. In the region adjacent to the joint, the spar is provided with enlarged portion which has a number of teeth which mesh with corresponding teeth on the adjacent spar section. The surface shell structure can also be provided with reinforcing strips which are similarly provided with inter-meshing teeth and intermediate connection means of various constructions.

WO 2009/034291 discloses joints between adjacent spar caps in which the width of the spar caps tapers adjacent to the joint. The tapered surfaces are then bonded together and additional supports are provided between the shear webs to strengthen the joint.

Another example of adjoining adjacent spar sections is disclosed in US 2009/0162208. The joint between spar segments disclosed in this document is shown in FIG. 1.

This comprises a first spar segment 1 and a second spar segment 2. Each spar segment consists of a shear web 3 with a spar cap 4 on each side. In the first spar segment 1, the shear web 3 stops short of the end of the spar caps. Each of the spar caps has a tapered end with an inclined inwardly facing tapered lower surface.

For the second spar segment 2, the shear web and spar caps are coterminous. In this case, the outer faces of the spar caps taper inwardly to provide a tapered surface 6 complementary to the respective tapered surface 5 on the first spar cap 1. The two spar caps are then bonded together between the adjacent tapered surfaces 5, 6 to form the completed spar. By tapering the depth of the spar caps, rather than the width as in WO 2009/034291, the bond area is greatly increased thereby increasing the strength of the joint.

However, this design suffers from a number of drawbacks. Firstly, as will be apparent from FIG. 1, in the first spar segment 1, the spar caps protrude beyond the edge of the shear web and are long, thin components which are unsupported, at this point, by the shear web 3. These portions of the spar cap can extend for several metres. As such, they are highly vulnerable to damage in transit and assembly.

Secondly, the two spar sections themselves are long components extending for up to 50 metres (but are more typically 20-30 metres). It is difficult, in practice, to provide stable support for the two segments as the adhesive is applied to the inclined surfaces and then to move one with respect to the other into the correct alignment and then hold it in position until the laminating process is completed and the resin has cured.

Finally, as the direction in which the inclined surfaces 5, 6 extend is close to the direction in which the two components are brought together in view of the shallowness of the taper, this can cause problems with the adhesive during assembly. In particular, any misalignment on assembly can scrape the adhesive from the surfaces 5, 6 particularly at the leading edge of the spar caps 4 of the second spar segment leading to voids in the bond line which causes problems for the reliability of the joint and ultimately failure of the joint. The spar is then surrounded by an aerodynamic fairing F to complete the blade.

SUMMARY OF THE INVENTION

The present invention is directed to providing an improvement of such a joint.

According to a first aspect of the present invention, there is provided a wind turbine blade comprising an aerodynamic fairing supported along at least a portion of its axial length by a spar, the spar comprising at least two spar segments joined end-to-end at an interface, each spar segment comprising a shear web with a spar cap on each side; wherein the outer face of each spar cap tapers inwardly towards the interface such that its depth is reduced towards the interface creating a recess on each side of the interface formed by the tapered faces of adjacent spar caps; and a respective connection piece sized to fit into each recess, each connection piece being fixed to the tapered faces of adjacent spar caps to form a double scarf joint.

The present invention therefore offers a number of benefits over the prior art joint.

In particular, neither of the spar segments has the protruding spar caps which are susceptible to damage during transportation. Secondly, the two spar segments or the two spar caps can be precisely aligned with respect to one another in their final position before the connection piece is fitted. This simplifies the assembly process and reliability of the joint. The connection piece is a small component which is easy to handle. It is brought into place in a direction which is close to being orthogonal to the direction in which the tapered surfaces extend. Therefore, any scraping between adjacent tapered surfaces caused by slight misalignment of the components is far less likely to occur. Even if it does occur, the orientation of the surfaces means that touching which does occur will have a significantly reduced effect. This greatly increases the reliability of the bond.

Similar joint configurations are disclosed in WO 2009/077192 for joining solid blocks of wood and in FR 2710871 in ship building applications.

EP 2186622 discloses a joint for aircraft wings. This uses a splice joint in all parts of the beam section, namely the webs and flanges. The techniques described in this patent are ones which are suitable only for a high cost application such as aeroplane building. The assembly process requires a complex assembly plant which requires a sophisticated vacuum bag arrangement and an associated heating and cooling system. Such plant is entirely unsuitable for wind turbine blade manufacture where the blade segments are often required to be assembled at a location close to the region where the wind turbine is to be erected. Even if they are assembled in a factory environment, the cost of the assembly plant shown in EP 2186622 is simply not justifiable in the wind turbine industry.

Preferably, the end of each shear web is substantially perpendicular (when viewed in cross section in an axial plane running parallel to the spar caps) to the axial direction such that the ends of the shear webs support one another. Also preferably, there is no double scarf joint between the shear webs. This provides a simplified yet robust construction where the connection pieces are confined only to the spar caps and the webs are mutually supporting.

The connection piece may be fixed in place by bonding. In this case, the connection piece is provided as a single piece. This is preferably a pre-cured part. For the reasons mentioned above, the ease of handling of the connection piece and the direction of movement will not unduly disturb the adhesive in the joint.

Alternatively, the connection piece may be formed in situ as a number of laminations. In this case, the laminated connection piece can be formed in a very controlled and accessible location. This ensures that the surface can be well prepared and that the quality of the laminate can be high thereby greatly increasing the reliability of the connection.

Another benefit provided by the present invention is its versatility in that it can be assembled by different methods depending on whether it is required to be assembled in the field, because transport issues mean that a full length spar cannot be transported to the site of the wind turbine, or if it is to be assembled in the factory. For the in-field assembly separate spar segments comprising their own spar caps and at least one shear web are assembled and transported to the site for in-field assembly. Each segment is then connected together end to end.

Preferably, a support member receives and aligns the shear webs relatively to one another. This support member may be a separate component, or it may take the form of one or more projections which are part of one or both shear webs. If the support member is a separate component, the shear webs continue to support one another albeit indirectly via the support member.

Preferably, however, the spar segments are connected together via their shear webs. Such a joint between shear webs may take the form of mechanical fasteners and/or adhesive (which may be applied via the support) and may be temporary and/or permanent. It should be noted that the joint is primarily required to be sufficient to hold the two segments adjacent to one another whilst the bond is made between the spar caps and the connection piece. This joint also forms the shear connection across the two spar segments. This provides a simple way of locating and joining the segments for "in-field" assembly.

For a factory assembly, a different approach may be taken. This time, the full length spar caps are first assembled before attaching the or each shear web. In this case, according to a second aspect of the present invention, there is a preferably provided a method of making a blade according to the first aspect of the invention comprising the steps of inserting spar caps of adjacent segments into a U-shape channel with their tapered surfaces uppermost, and fitting the connection piece to the tapered surfaces on the adjacent spar caps.

Additional spar caps may be added as necessary with addition connection pieces to complete the full length spar cap.

A second spar cap is then formed in the same way and the two spar caps are joined with at least one shear web to form a first spar beam.

This first spar beam may then be joined side by side to a second spar beam formed in the same way. Three or more beams may be joined in this way.

This provides a method which is extremely versatile, and yet relies on a relatively small number of component parts and assembly jigs. The spar caps have the same external shape and size in order to be assembled in the same U-shape channel. This may (if required) be the channel in which the spar caps are initially formed, thereby further reducing the required tooling. However, the process remains versatile in that the depth of the web can be varied to create beams of different heights, and even to create beams with heights that vary along their length. Also, by offsetting the first and second spar beam when they are joined side by side, a virtual "twist" can be incorporated into the beam. Thus, from a very small set of component parts and very simple tooling, complex beam shapes can be produced.

The spar segments may be any beam section having a shear web with a spar cap on each side, such as an I beam, C beam or box beam. The invention is also applicable to spar segments made of two or more beam sections connected side-by-side.

BRIEF DESCRIPTION OF THE DRAWINGS

An example of a spar for a wind turbine blade will now be described with reference to the accompanying drawings, in which:

FIG. 9 is a diagrammatic view showing the jig used to assembly the complete spar caps as shown in FIGS. 8A-8D; and FIGS. 9A-9C are cross-section through lines AA, BB and CC in FIG. 9 respectively.

DETAILED DESCRIPTION

Figure 1:
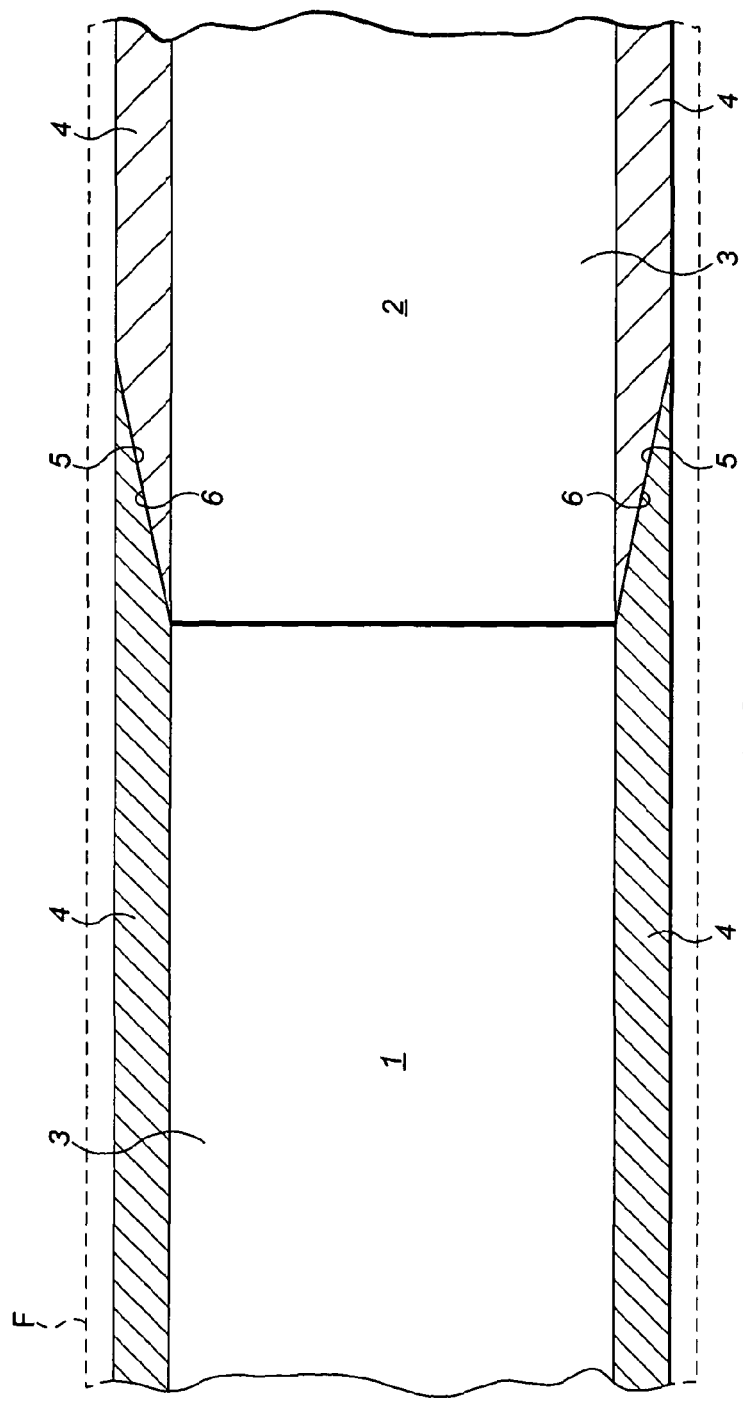
FIG. 1 is a cross-section through two spar caps in accordance with the prior art.
Figure 2:
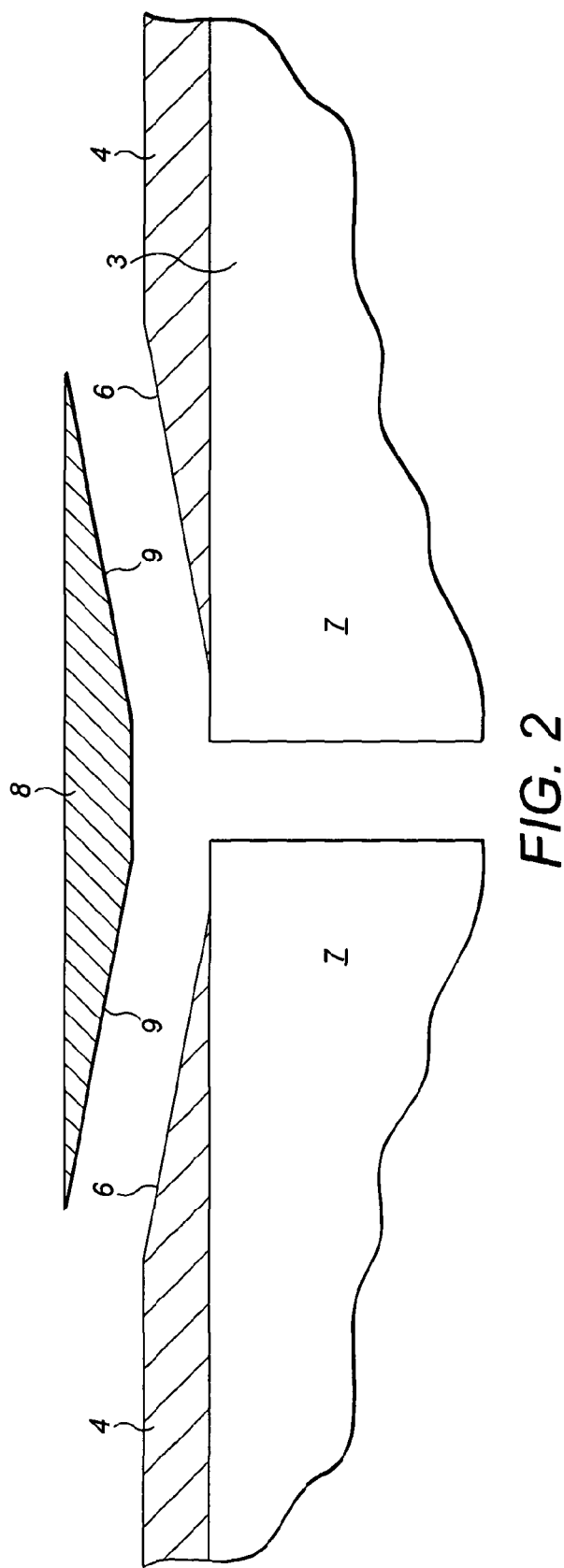
FIG. 2 is a cross-section through the upper part of two spar cap segments and connection piece of the present invention prior to assembly.

The spar comprises two spar segments 7 which are essentially the same in structure as the second spar segment 2 shown in FIG. 1. Each has a shear web 3, made of the multi-axial material and spar caps 4 are provided on either side which are formed predominantly of a uni-axial material which are preferably formed as pulltrusions, but could also be made from prepreg, laminations or other pre-forms known in the art which give cost effective spar caps with good mechanical properties.

Further details of the construction and materials of the spar sections are disclosed in our own earlier WO 2009/034291.

At the end adjacent to the joint, each of the spar caps 4 has a tapered surface 6 as described above in relation to FIG. 1.

Figure 3:
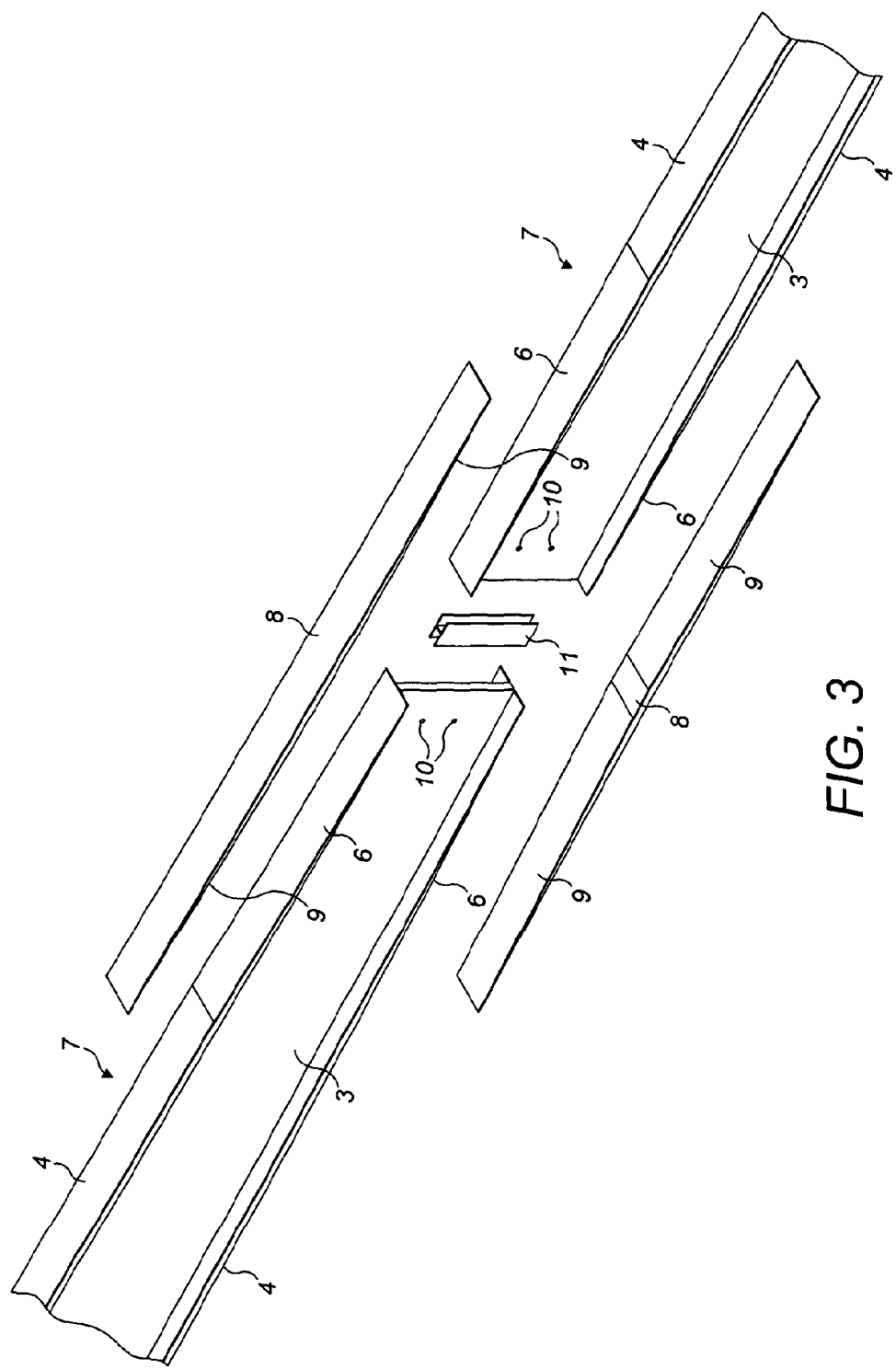
FIG. 3 is a perspective view of the FIG. 2 joint prior to assembly.
Figure 4:
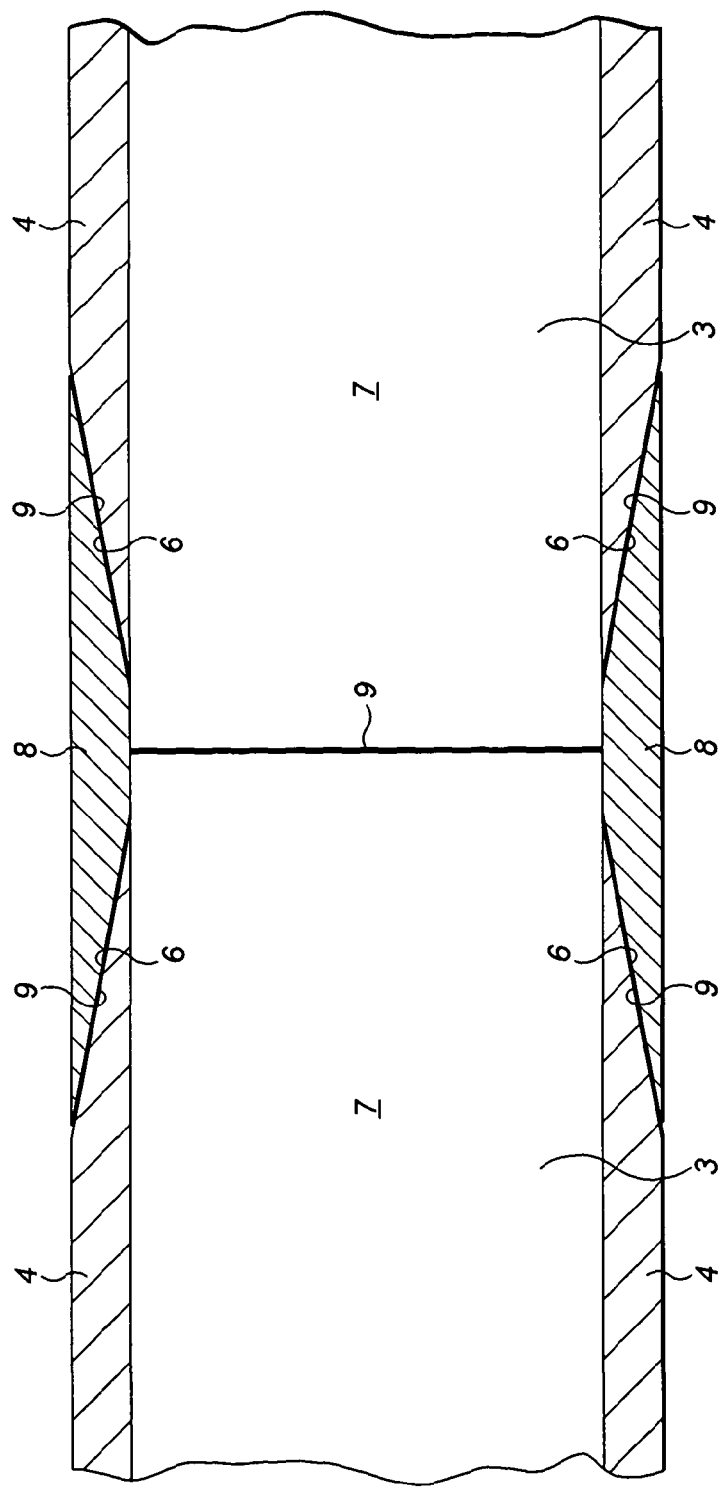
FIG. 4 is a cross-section of the whole joint with the components assembled.

A pair of connection pieces 8 have a width and depth which corresponds to the width and depth of the adjacent spar caps 4 and have inclined faces 9 which correspond to the inclined faces 6 of the spar caps 6 so that, in use, as shown in FIG. 3, the connection pieces 8 are flush with adjacent spar caps 4.

The assembly process for the joint in the field is as follows.

As an initial step, the spar segments 7 are supported by a jig through orifices 10 and are brought together end-to-end so that the shear webs 3 meet at interface 9. They may be supported in this position by a support 11, preferably made of multi-axial material (FIG. 3) which receives and aligns the two shear webs 3. This support 11 fits exactly between the spar caps 4 so as to align the two segments 7 vertically. They are then bonded together or fastened using mechanical fasteners, the joint either being temporary or permanent. Although this involves handling two large components, this operation should be contrasted with the bonding operation described above in relation to FIG. 1. The bonding operation just described is simply to locate the two parts together after which the main bonding operation is carried out. In relation to FIG. 1, the operation being carried out was the main bonding operation between the two components. In the case of FIG. 1, any difficulties in handling the two large components directly affect the quality of the joint for the reasons set out above.

Once the two segments have been located with respect to one another, adhesive can be applied to the inclined surfaces 6, 9 as the connection piece is then moved into place in a direction orthogonal to the longitudinal dimension of the spar.

Rather than bonding together two large components, this operation simply requires the bonding of two small connection pieces 8 to a larger underlying structure. Handling of the connection pieces 8 is therefore much more straightforward than attempting to bond two spar segments together. As a result, the connection piece 7 can be handled with greater stability. Better still, any misalignment of the connection piece which might tend to disturb adhesive from one of the surfaces will not move the adhesive a significant distance given that the connection piece 7 itself only moves through a very short distance to its bonding position as compared to the bonding together of the two spar segments where the greater distances involved introduce far greater potential for scraping adhesive from larger areas.

Figure 5:
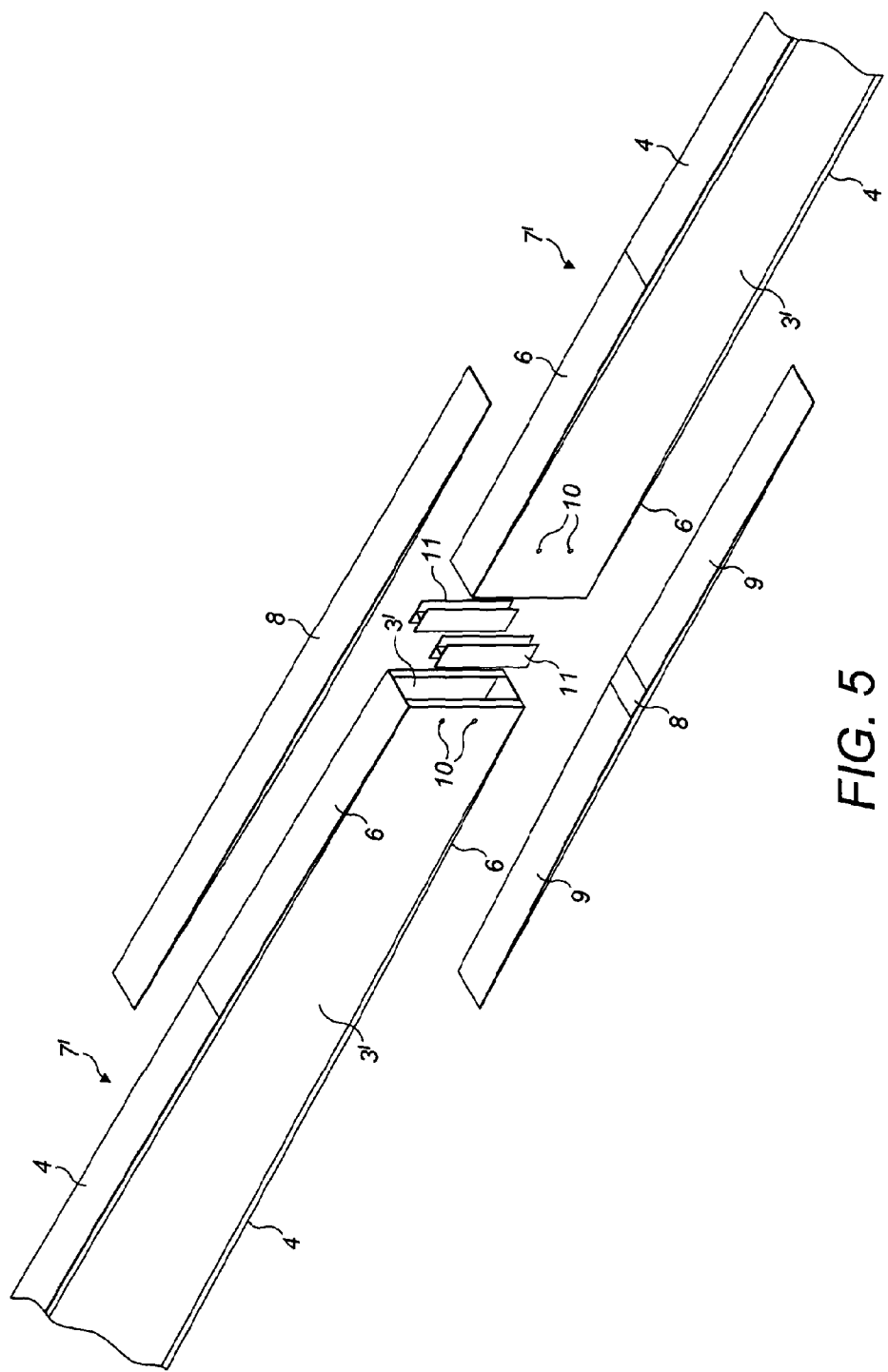
FIG. 5 is a perspective view of a second joint prior to assembly.

A second joint is shown in FIG. 5. This is the same in most respects as the first joint and the same reference numerals have been used to designate the same components. The difference is that the joint is being applied to a box beam rather than the I beam of the first joint. Thus, each spar segment 7' has a pair of shear webs 3', one on each side of a respective spar cap. The joint is the same, except that two supports 10 are used, one for each shear web 3'.

Figure 6:
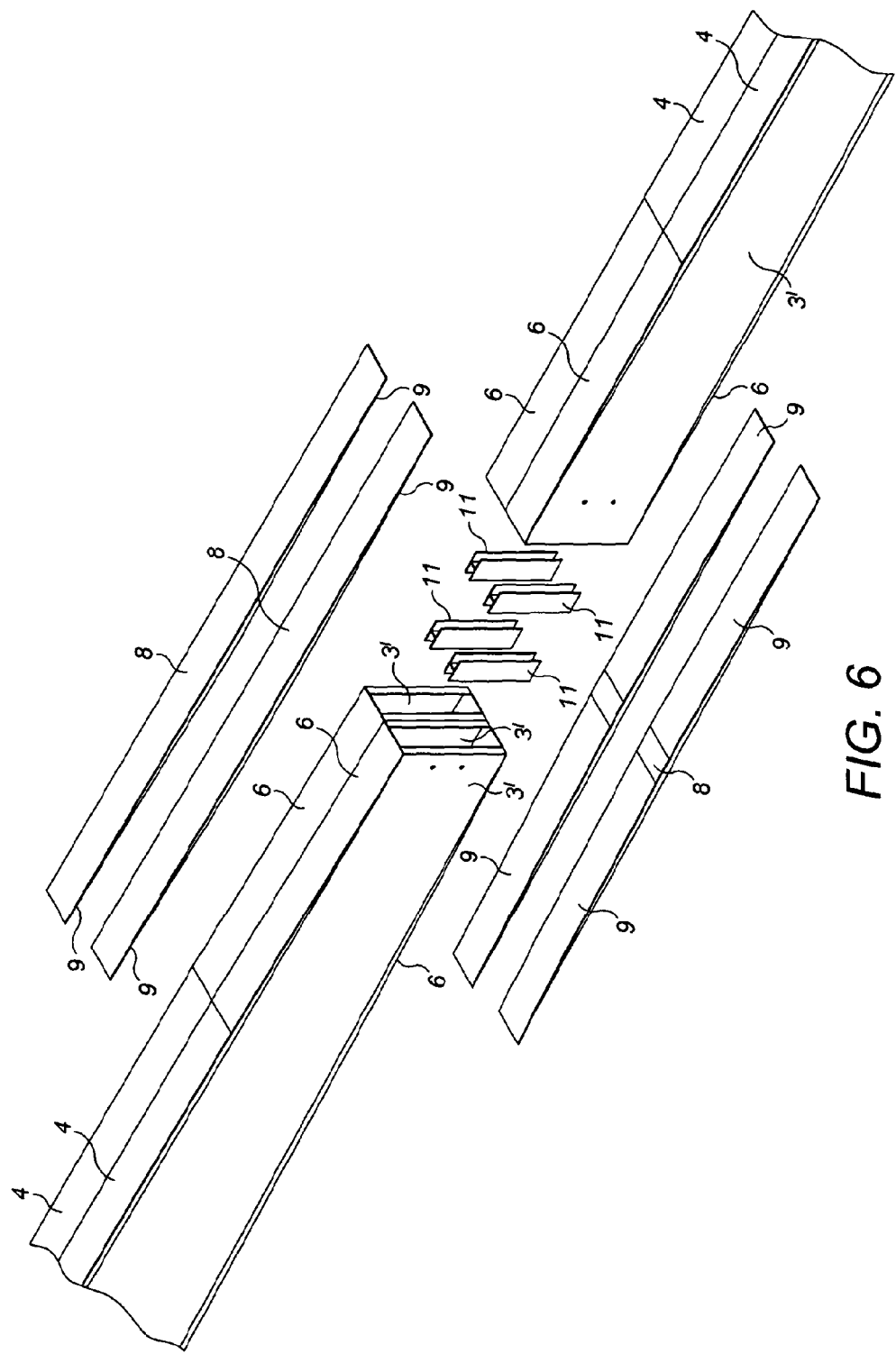
FIG. 6 is a perspective view of a third joint prior to assembly.

A third joint is shown in FIG. 6. This is simply a double version of the joint of FIG. 5. It will be appreciated from this that the joint can be applied to beams connected side-by-side with a small gap between adjacent shear webs to receive supports 11. The two beams shown in FIG. 6 are slightly off-set. By building up several beams in this way, a spar with a more complex shape can be formed.

Figure 7A:
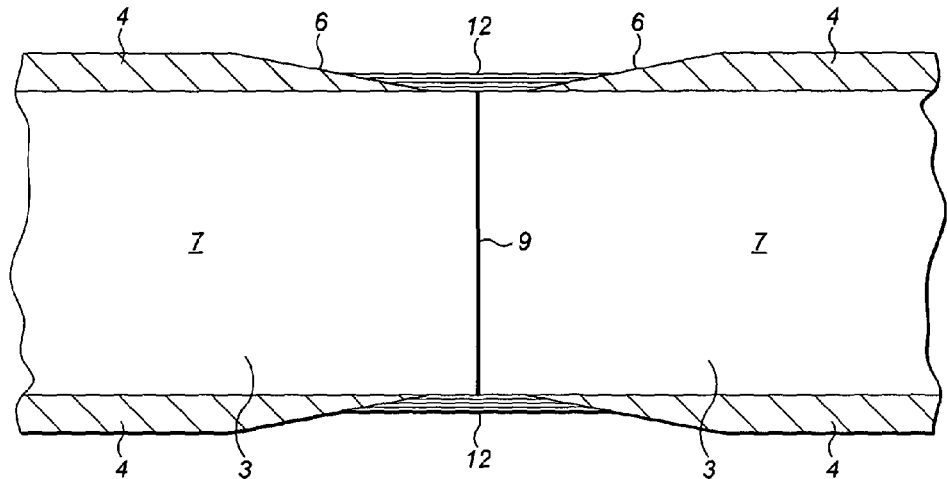
FIGS. 7A and 7B are views similar to FIG. 2 showing a fourth joint, with FIG. 7A showing the joint in a partially assembled condition.
Figure 7B:
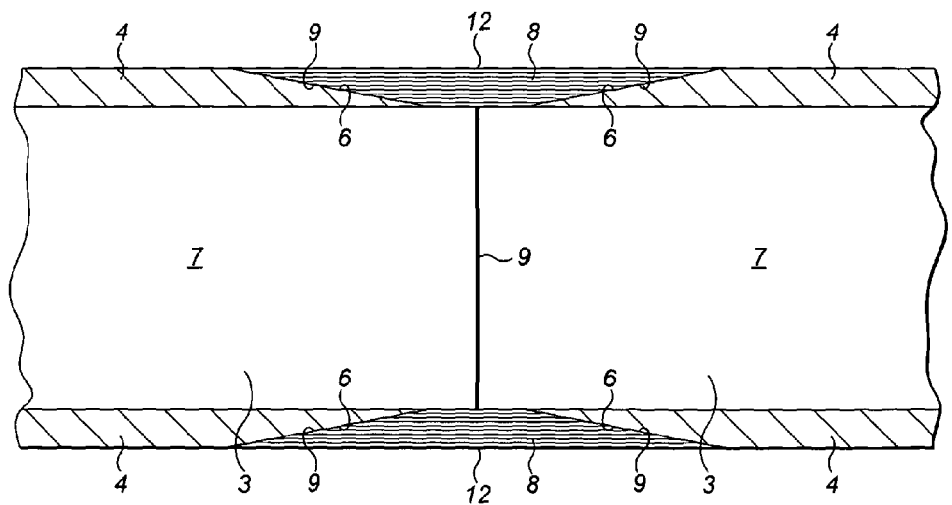

A fourth joint is shown in FIGS. 7A and 7B. In this case, the connector piece is laminated 'in situ'. This could be achieved by utilising any composite laminating techniques (or combinations) that are well known in the art such as wet laminating, resin infusion and prepreg for example. The 'laminate stack' will consist of predominantly unidirectional fibres with the principal direction along the axis of the spar and a small percentage of multi-axial fibres to stabilise the structure and assist in the laminating (typically about 10-20%). The fibres may be glass, carbon, aramid or other structure fibre and the resin may be epoxy, vinylester, polyester or polyurethane for example. The stack is created by placing each layer 12 into the recess created by the two spar ends, starting with short lengths of laminate on the first layers (FIG. 7A) and then increasing to longer lengths on the later laminate as the recess size increases as is well known in the art. Once the laminate stack has been created (including resin) it will then be heated to cure the laminate 'in situ', this is also typically carried out under light vacuum. This method may be applied to any of the beam types in the previous examples.

An example of the assembly of the spar in factories shown in FIGS. 8 and 9.

Figure 8A:
FIGS. 8A-8D are schematic representations of a second assembly process for a spar.
Figure 8B:
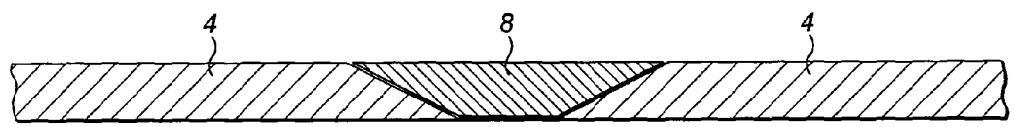
Figure 8C:
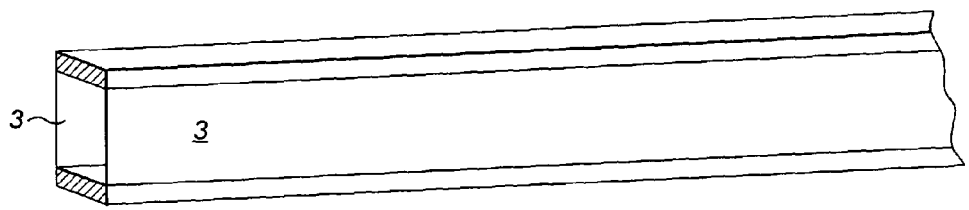
Figure 8D:
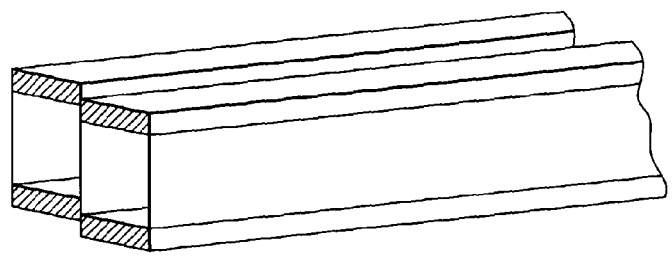

Unlike the previous examples where the beam sections are made up and then joined end to end, if the joint is made in a factory, full length components can be made from the outset. Initially, two spar caps 4 (as shown in FIG. 8A) are inserted into a jig as shown in FIG. 9. As shown, the jig is a main jig 20 with two end sections 21 in which the spar caps are clamped, for example using a G clamp. A very simple vacuum bag may also be used for this purpose. The jig and end sections 20, 21 all have a U-shaped cross-section as in FIGS. 9A-C. Instead of the jig and end sections 20, 21, the same process may be carried out using the tool that was initially used to form the spar caps. If the spar is made up of more than one section, the sections can be made at the same time in additional jigs arranged next to the illustrated jig. Alternatively, one section can be made as shown in FIG. 9 and then the joined sub-assembly can be moved across to allow the next section to be joined. Once in place, the connection piece 8 is added using one of the methods described above as down in FIG. 8B. The joint is then cured at a curing temperature of 50-120° C. (which temperature range is suitable for curing all of the examples disclosed above). Additional connections can be made until the full length of spar cap is made. This process is repeated making a second spar cap. These two spar caps are then joined by a pair of webs 3 as shown in FIG. 8C. In order to make more complex shape of spar, two beams are then joined side to side as shown in FIG. 8D. As previously mentioned, the two beams may be offset and may be of different depths to enable complex beam sections to be made.

What is claimed is:

1. A wind turbine blade comprising an aerodynamic fairing supported along at least a portion of its axial length by a spar, the spar comprising at least two spar segments joined end-to-end at an interface, each spar segment comprising a shear web with a spar cap on each side; wherein the outer face of each spar cap tapers inwardly towards the interface such that its depth is reduced towards the interface creating a recess on each side of the interface formed by the tapered faces of adjacent spar caps; and a respective connection piece sized to fit into each recess, each connection piece being fixed to the tapered faces of adjacent spar caps to form a double scarf joint.

2. A blade according to claim 1, wherein the end of each shear web is substantially perpendicular to the axial direction such that the ends of the shear webs support one another.

3. A blade according to claim 1, wherein there is no double scarf joint between the shear webs.

4. A blade according to claim 1, wherein the connection piece is bonded to the tapered faces of adjacent spar caps.

5. A blade according to claim 4, wherein the connection piece is a pre-cured component.

6. A blade according to claim 1, wherein the connection piece is formed in situ from a plurality of laminations.

7. A blade according to claim 1, wherein the shear webs of adjacent spar segments are connected together.

8. A blade according to claim 7, wherein the shear webs of adjacent spar segments are bonded together with adhesive.

9. A blade according to claim 1, further comprising a support member which receives and aligns the shear webs relatively to one another.

10. A blade according to claim 6, wherein adjacent spar segments are bonded together with adhesive that is applied to the support member.

11. A method of making a blade according to claim 1 comprising the steps of inserting spar caps of adjacent segments into a U-shaped channel with their tapered surface uppermost; and fitting the connection piece to the tapered surfaces of the adjacent spar caps.

12. A method according to claim 11, further comprising subsequently joining additional spar caps with additional connection pieces to the subassembly formed by the method of claim 11.

13. A method according to claim 12, further comprising repeating the steps of claim 12 to form a second spar cap, joining the two spar caps with at least one shear web to form a first spar beam.

14. A method according to claim 13, further comprising repeating the steps of claim 11 to form a second spar beam and joining the first and second beams side by side to form a spar.

15. A method according to claim 11, where the U-shaped channel is the channel used to form the spar caps.

\* \* \* \* \*